United States Patent
Labana et al.

(10) Patent No.: US 9,696,983 B2
(45) Date of Patent: Jul. 4, 2017

(54) DYNAMIC UPDATING OF OPERATING SYSTEMS AND APPLICATIONS USING VOLUME ATTACHMENT

(71) Applicant: CloudVolumes, Inc., Santa Clara, CA (US)

(72) Inventors: Harpreet Singh Labana, Palo Alto, CA (US); Rajesh H. Parekh, Los Altos, CA (US)

(73) Assignee: VMware, Inc., Palo Alto, CA (US)

(*) Notice: Subject to any disclaimer, the term of this patent is extended or adjusted under 35 U.S.C. 154(b) by 135 days.

(21) Appl. No.: 14/644,971

(22) Filed: Mar. 11, 2015

(65) Prior Publication Data

US 2015/0309783 A1    Oct. 29, 2015

Related U.S. Application Data

(60) Provisional application No. 61/984,514, filed on Apr. 25, 2014.

(51) Int. Cl.
     *G06F 9/44*        (2006.01)
     *G06F 9/445*      (2006.01)

(52) U.S. Cl.
     CPC ...................................... *G06F 8/65* (2013.01)

(58) Field of Classification Search
     CPC ........................................................ G06F 8/65
     USPC ........................................................ 717/168
     See application file for complete search history.

(56) References Cited

U.S. PATENT DOCUMENTS

| | | | |
|---|---|---|---|
| 6,493,871 B1 * | 12/2002 | McGuire | G06F 8/65 717/169 |
| 6,961,941 B1 | 11/2005 | Nelson et al. | |
| 7,356,679 B1 | 4/2008 | Le et al. | |
| 8,286,174 B1 | 10/2012 | Schmidt et al. | |
| 2005/0097543 A1 * | 5/2005 | Hirayama | G06F 8/65 717/168 |
| 2007/0168962 A1 * | 7/2007 | Heinke | G06F 9/44505 717/120 |
| 2007/0198656 A1 | 8/2007 | Mazzaferri et al. | |
| 2008/0244577 A1 * | 10/2008 | Le | G06F 8/63 718/1 |
| 2009/0037680 A1 | 2/2009 | Colbert et al. | |
| 2010/0070978 A1 | 3/2010 | Chawla et al. | |
| 2011/0022694 A1 | 1/2011 | Dalal et al. | |
| 2011/0083122 A1 | 4/2011 | Chen et al. | |
| 2011/0185292 A1 | 7/2011 | Chawla et al. | |
| 2012/0144391 A1 | 6/2012 | Ueda | |
| 2012/0174096 A1 | 7/2012 | Conover | |
| 2012/0246642 A1 | 9/2012 | Pafumi et al. | |
| 2014/0201725 A1 | 7/2014 | Tian et al. | |
| 2014/0282472 A1 * | 9/2014 | Vinograd | G06F 8/65 717/170 |

* cited by examiner

*Primary Examiner* — Wei Zhen
*Assistant Examiner* — Lanny Ung

(57) ABSTRACT

Examples disclosed herein provide systems, methods, and software to attach updated applications to computing devices. In one instance, a method of attaching updated applications to a computing device includes identifying an application update for an application stored on the computing device, and determining an updated application volume containing an updated version of the application. The method further includes mounting the updated application volume to the computing device, and overlaying the updated version of the application with the application stored on the computing device.

19 Claims, 6 Drawing Sheets

DYNAMIC UPDATING OF OPERATING SYSTEMS AND APPLICATIONS USING VOLUME ATTACHMENT

RELATED APPLICATIONS

This application is related to and claims priority to U.S. Provisional Patent Application No. 61/984,514, entitled "DYNAMIC UPDATING OF OPERATING SYSTEMS AND APPLICATIONS USING VOLUME ATTACHMENT," filed on Apr. 25, 2014, and which is hereby incorporated by reference in its entirety.

TECHNICAL BACKGROUND

Software applications are sometimes subject to updates, such as when new versions of an application are produced, when patches are created, or for other reasons. While many benefits are associated with updating an application, updates can lead to frustration when they occur at inopportune or inconvenient times.

Updates can be time consuming and inconvenient because the application being updated (or upgraded) must be halted for a period of time while the directories, files, registry keys, and other elements of the application are downloaded, extracted, and written to disk. Downloading an update can take a substantial amount of time, as can extracting and writing the files to disk. Such inconveniences encourage users to put-off updating their software applications or, in some cases, to avoid updates entirely.

In the field of virtual machines, applications that are installed on virtual machines may also be subject to update processes. However, the nature of virtual machines is such that updating an application on a virtual machine may, in some examples, take even longer to update than its desktop counterpart. In enterprise environments where large numbers of virtual machines are employed, application maintenance and updates can be a very arduous task for personnel to manage.

The frequency with which applications are updated has increased as of late, which only exacerbates some of the downsides to updating an application. In the distant past, software updates were released only occasionally via disk. As online updates proliferated, annual, bi-annual, or quarterly updates were not uncommon. A recent trend is towards even more frequent software updates, with some applications receiving updates monthly, weekly or even daily, straining the ability of personnel to accommodate them.

OVERVIEW

The technology disclosed herein enhances how software applications can be updated. In at least one implementation, an application that is installed on a computing device (physical or virtual) is updated by attaching an update to the application. Attaching the update includes mounting an application volume that contains at least a portion of an updated version of the application. Once mounted, the updated version of the application is overlaid with respect to the application stored on the computing device. Thus, at least some of the steps associated with a traditional update, such as copying over the relevant files and writing them to disk, can be avoided, saving time and processing resources.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

Figure 1:
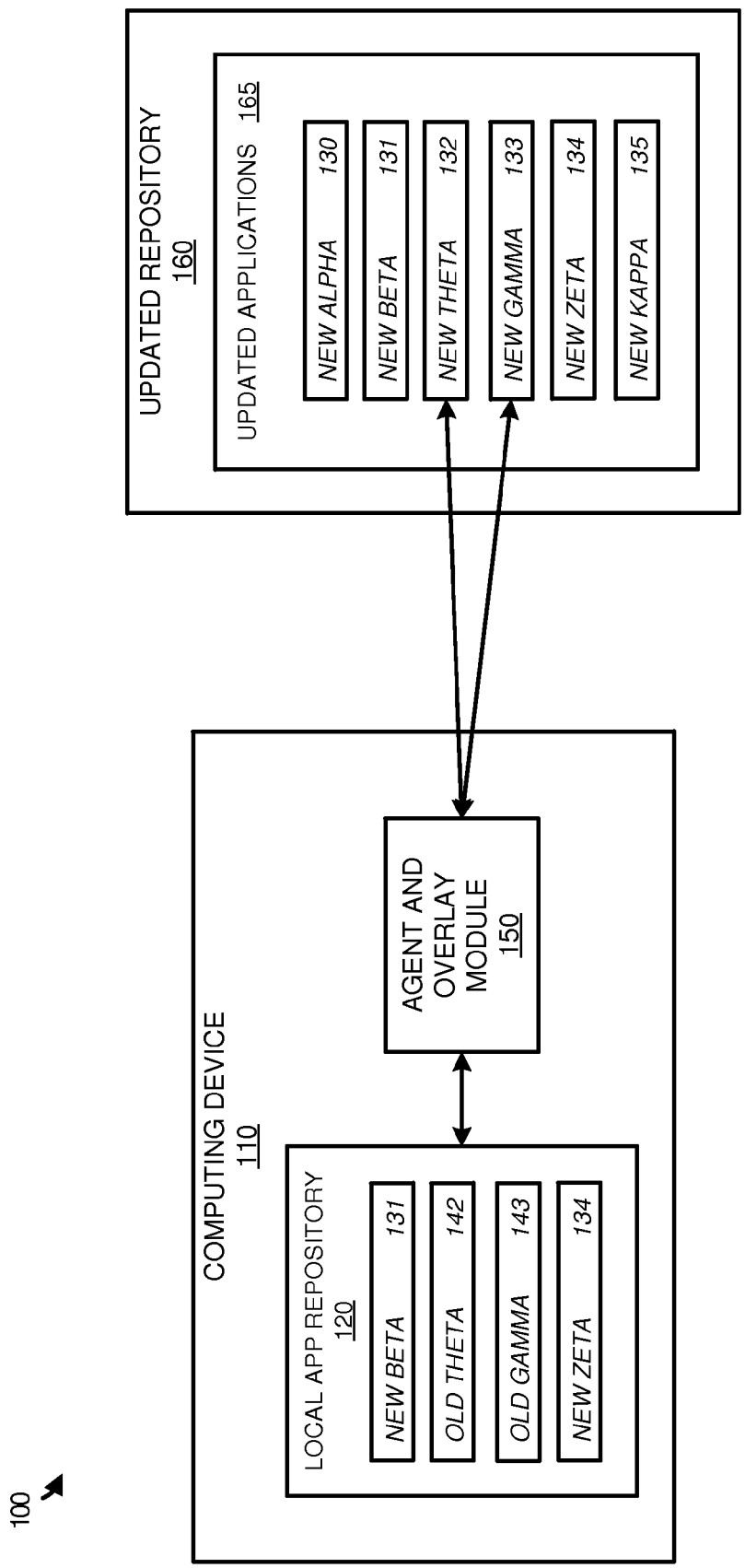
FIG. 1 illustrates a computing environment for providing updated applications to a computing device in an implementation.

In various situations, an application installed on a physical or virtual computing device may need to be updated to provide enhanced features, patch a security issue, or make other adjustments to the application. To limit the downtime of an application during an application update, a secondary application repository is utilized that includes one or more application storage volumes that can be attached in order to accomplish the update. Such an application storage volume may include a file or files representative of an update to the application. Rather than having to download, extract, and write the files to disk, the application storage volume can be attached by mounting the volume and overlaying the contents, such as files and directories, with respect to their local counterparts.

Mounting an application may be accomplished by associating a name of a volume with an access path to the volume. Once mounted, the updated application files, directories, and other application elements may be overlaid within the file system of the virtual machine to provide the user with access to the updated application without going through the updating process. Overlaying may be accomplished by editing the file system to redirect requests to the updated components on the newly-mounted volume, rather than pointing to their local counterpart components that were previously installed and are subject to the updates.

In some implementations, the application storage volumes may be managed by an administrator or some other management service that provides updated versions of applications to one or more end users. These volumes contain updated versions of the applications, including files and directories that have been extracted and stored from application updates supplied by the application vendors. Examples of application storage volumes include, but are not limited to, virtual hard disks (VHDs), virtual machine disks (VMDKs), or other similar virtual drives on which an application can be stored. A storage volume may also be a physical storage device in some examples.

In one example, a user of a virtual machine may have a locally installed version of a word processing application. During the execution of the virtual machine, the virtual machine or the host machine may identify that an update is available for the application. Accordingly, instead of updating the local application in the traditional manner, and thereby preventing access to the application for the end user, a request may be initiated to attach an application volume to the virtual machine that contains the updated application. Attaching an application volume may include mounting a specific volume that has updated components for an application stored in it and overlaying the updated components with respect to their local counterparts.

Optionally, once a downtime or other upgradeable moment is determined, the locally installed application may be updated and the application volume detached from the virtual machine. In some instances, the process of detaching the application volume may include un-mounting the application volume from the computing device, or preventing the computing device from accessing the application volume and the corresponding components. Detaching may also include editing the file system to direct requests to the locally installed components. It may be appreciated that the terms "locally installed" may refer to components that are local with respect to a physical machine, local with respect to a virtual machine, or both.

In some examples, one or more virtual machines may be initiated on a host computing system as a part of a service. For example, the virtual machines may be provisioned on a host server within a data center as part of an Infrastructure-as-a-Service (IAAS) offering or other cloud computing service provided by a service provider. This service may allocate the virtual machines to one or more users, allowing the users to access particular applications that suit the users' preferences and requirements. To access the one or more virtual machines, remote computing devices, such as desktop computers, laptop computers, smart phones, tablets, and the like, may remotely login or access the virtual machines using the internet or other similar communication network. Once accessed, the user of the remote device may execute the various applications located on the virtual machine, and update the applications as described herein.

Although the previous examples demonstrated the attachment of an application to a virtual machine, it should be understood that similar principles might apply to physical computing devices, such as servers or desktops. Further, although the previous example suggested the updating of a particular application, it should be understood that the operating system of the virtual or physical machine might be updated using similar principles.

To further illustrate the attaching of updated applications, FIG. 1 is included. FIG. 1 illustrates a computing environment 100 for attaching updated applications to computing devices. Computing environment 100 includes computing device 110 and updated repository 160. Computing device 110 further includes local application repository 120, and agent and overlay module 150. Computing device 110 may comprise a physical computing device, such as a desktop or server computer, or may represent a virtual computing device, such as a virtual machine. Updated repository 160 further includes updated applications 165, which comprise new applications 130-135.

In operation, computing device 110 includes local application repository 120 that stores installed applications 131, 134, 142, and 143. These applications are installed by a user or some other process, and may be downloaded from the Internet, installed from another storage media, or installed from some other similar source. Once installed on computing device 110, computing device 110 may execute the applications, via a processing system, to perform useful operations, such as word processing, image editing, and other similar operations. As time progresses, the applications that are stored on computing device 110 may need to be updated, which may require the user to exit the applications and possibly restart computing device 110. Accordingly, a user may wish to delay the updating of applications if the user is busy using the application or intends to use the application in the immediate future.

In the present instance, instead of requiring the user to immediately update the applications stored in local application repository 120 to receive the enhanced features, security patches, and other updates, updated repository 160 comprising one or more application volumes is accessible to computing device 110. Updated repository 160 may be stored on the same physical computing system as computing device 110, may comprise a networked storage device accessible by computing device 110, or may be any other similar storage repository. Updated repository 160 may be managed by an administrator, and stores the files, directories, and other application components necessary for updated applications 165. The updated application components may be downloaded as application updates from the application vendors, extracted, and stored to the one or more volumes in updated repository 160. As a result of the availability of updated repository 160, agent and overlay module 150 may initiate the attachment of one or more storage volumes in updated repository 160 that contain the updated applications, and may overlay the updated files, directories, and keys, such that the updated components take precedence over the older applications.

In some examples, the updated application components may be virtually overlaid within the file system of the computing device, directing the execution of the application from a combination of local application repository 120 and updated repository 160. For example, although the application files and directories may be located in updated repository 160, pointers to the files, directories, and keys may be provided in the same directory location as the locally installed application. Thus, when an application is selected, the components that have not been updated may be executed from local application repository 120, and the components that are new or updated may be executed from updated repository 160.

Figure 2:
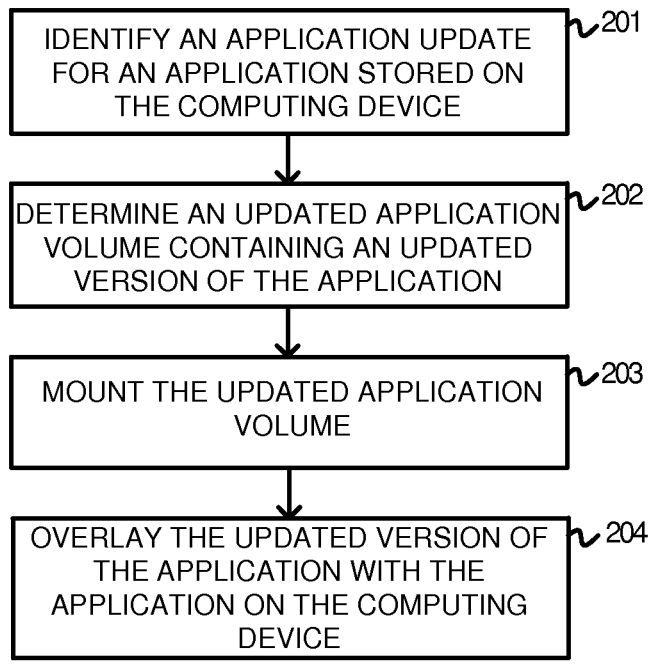
FIG. 2 illustrates a method for providing updated applications to a computing device in an implementation.

To further illustrate the operation of computing environment 100, FIG. 2 is included. FIG. 2 illustrates a method of providing an updated application to a computing device according to one example. The operations of FIG. 2 are referenced parenthetically in the description below.

In operation, a computing device, either physical or virtual, may have one or more applications installed that, when executed, allow the computing device to accomplish specific tasks. These tasks include word processing, image editing, and data processing, amongst a variety of other tasks—including combinations thereof. As time progresses, the applications that were initially installed may need to be updated to provide the user with enhanced features, security fixes, or other updates to the application.

In the present example, the method for attaching updated applications to the computing device includes identifying that an update is available for an application on the device (201). Responsive to this identification, determining an updated application volume containing an updated version of the application (202), and mounting the updated application volume to the computing device (203). Once the updated application volume is mounted, overlaying the updated version of the application in the computing device with the local application (204) to provide the device with the updated version of the application.

Referring to FIG. 1 as an example, computing device 110 includes a variety of applications that are capable of execution on the device. However, old applications theta and gamma 142-143 are not the most current version of the application. Accordingly, agent and overlay module 150 on computing device 110 identifies one or more application volumes within updated repository 160 that contain the updated applications. Once the volumes are identified, agent and overlay module 150 mounts the one or more volumes that contain the updated application and overlays the files, directories, and other updated elements necessary for the updated application. In some examples, mounting may include providing the computing device with an access path, such as an Internet Protocol address, directory path name, and other path information, to access the contents of the one or more volumes. Once mounted, overlaying the updated version of the application may comprise making the updated components of the application accessible through the same location or directory in the file system as the locally installed application components. Referring to computing environment 100, new applications theta and gamma 132-133 are located in one or more storage volumes to be provided to computing device 110. Once the volumes are identified, the application elements for new applications 132-133 are overlaid in computing device 110 and made available for execution on the device.

Although illustrated in the present example with a single computing device, it should be understood that any number of computing devices might be in communication with updated repository 160. As a result, a plurality of computing devices may make use of the applications stored on the one or more volumes of updated repository 160. Further, while illustrated internal to computing device 110, it should be understood that if computing device 110 comprises a virtual machine, agent and overlay module 150 might reside wholly or partially in the hypervisor or host providing the execution platform for computing device 110, or as a process on a separate physical computing system. Although not illustrated for simplicity, computing device 110 may also identify that there is an appropriate time to update the applications that are locally installed on computing device 110. This identification may occur when computing device 110 is idle, when the user identifies that it is acceptable to update the application, or at any other similar instance. Once the update event is identified, the volumes from updated repository 160 may be detached, and the local application components updated to reflect the current version of the application. In some instances, to detach the application volumes, the application volumes may be un-mounted from the computing device, preventing the updated components of the application from being accessible in the file system of the computing device.

Figure 3:
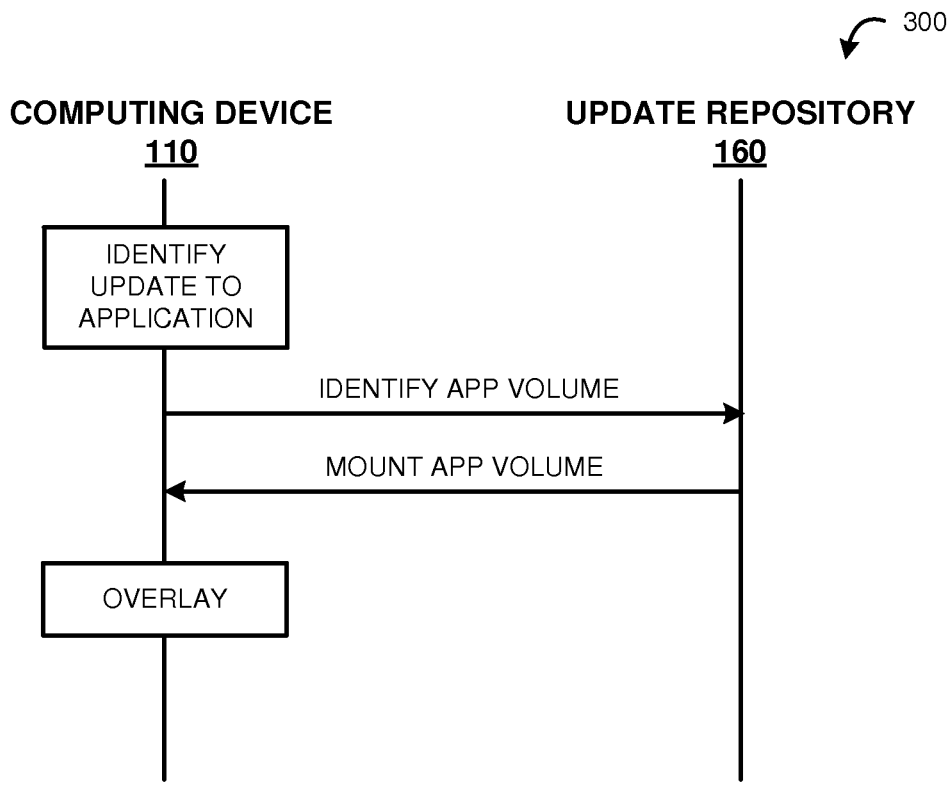
FIG. 3 illustrates a timing diagram for providing updated applications to a computing device in an implementation.

Referring now to FIG. 3, FIG. 3 illustrates a timing diagram 300 for providing updated applications to a computing device. In operation, computing device 110 may contain one or more applications that are capable of execution on the device. During the execution of device 110, the device identifies that there is an update to an application installed locally on the device. Instead of installing the update locally preventing the user from accessing the application for a period of time, computing device 110 initiates the identification of one or more application storage volumes in update repository 160 that contain the updated application. Once the one or more volumes are identified, the volumes are mounted for computing device 110, and the application components therein are overlaid in the file system and made available for execution. For instance, referring to FIG. 1, updated components for new application theta 132 would be used for execution over non-updated components from application theta 142.

In some examples, overlaying the application components for the updated application includes making the updated files and directories accessible within the file system of the computing device with the locally stored application components. Accordingly, when an application is executed, all of the required components for the updated version of the application may be identified in a single file system location or directory. Thus, as the application is executed, the components that were not updated may be executed from the local storage system, whereas updated components may be retrieved and executed from the updated repository.

Figure 4:
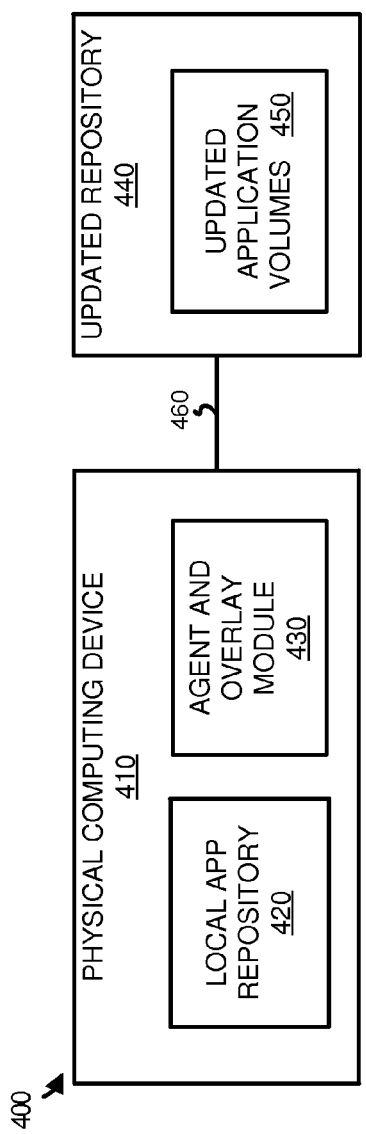
FIG. 4 illustrates a system to provide updated applications to a physical computing device in an implementation.

FIG. 4 illustrates a system 400 for providing updated applications to a physical computing device. System 400 includes physical computing device 410 that communicates over communication link 460 with updated repository 440. Physical computing device 410 further includes local application repository 420, and agent and overlay module 430. Updated repository 440 further includes updated application volumes 450 that contain one or more applications to be provided to client computing devices. These volumes contain updated versions of the applications, including files and directories that have been extracted and stored from application updates supplied by the application vendors.

In operation, physical computing device 410 may include one or more applications that are installed locally in local application repository 420. These applications, when executed, allow physical computing device 410 to perform a variety of useful and enjoyable tasks. Although a particular version of an application may initially be installed, the applications may require a variety of updates to provide additional features and patches. Accordingly, rather than installing the updated application components immediately, which may prevent the user from accessing the application, physical computing device 410 is configured to communicate with updated repository 440.

Updated repository 440 includes one or more updated applications that can be attached to physical computing devices, allowing the devices to have access to the updated application without going through the local update process. For example, agent and overlay module 430 may identify that an application has an update. Responsive to this identification, physical computing device 410 will mount one or more storage volumes from updated application volumes 450 that correspond to the updated application. Once mounted, the application will be made available by overlaying the necessary files that take precedence over the older version of the application.

Referring to the elements of system 400, physical computing device 410 may comprise a server computer, a desktop computer, or another similar computing device capable of mounting storage volumes with updated applications. Physical computing device 410 may include processing systems, storage systems, user interfaces, communication interfaces, or any other similar computing element.

Updated repository 440 includes one or more updated application volume 450. Updated application volumes 450 may include disk drives, solid state drives, virtual hard disks, and any other similar storage media—including combinations thereof. Updated application volumes 450 may further comprise partitions of physical storage media capable of storing the required applications, and may be located on a serving computer.

Communication link 460 uses metal, glass, optical, air, space, or some other material as the transport media. Communication link 460 can use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 460 can be a direct link or can include intermediate networks, systems, or devices, and can include a logical network link transported over multiple physical links. Although one main link 460 is shown in FIG. 4, it should be understood that link 460 is merely illustrative to show communication modes or access pathways.

Figure 5:
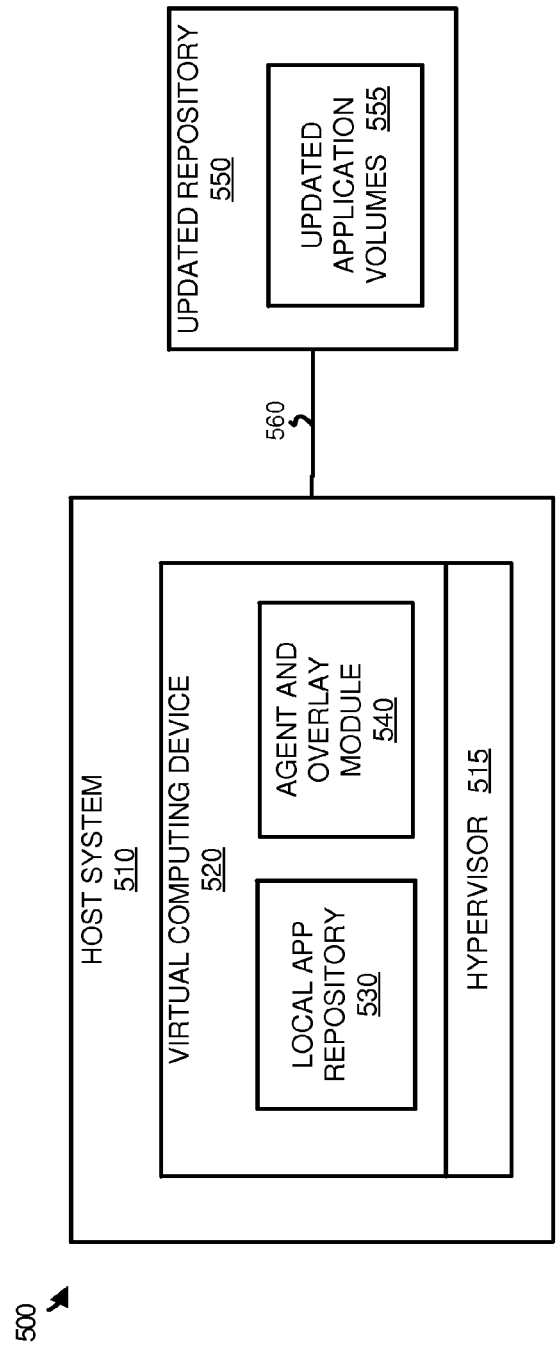
FIG. 5 illustrates a system to provide updated applications to a virtual computing device in an implementation.

Turning to FIG. 5, FIG. 5 illustrates a system 500 for providing updated applications to a virtual computing device according to one example. System 500 includes host system 510 that communicates with updated repository 550 over communication link 560. Host system 510 further includes hypervisor 515 and virtual computing device 520. Virtual computing device 520 further includes local application repository 530 and agent and overlay module 540. Updated repository 550 further includes updated application volumes 555. Although illustrated internal to virtual computing device 520 in the present example, it should be understood that agent and overlay module 540 might reside wholly or partially in hypervisor 515, as a service on host system 510, or on a separate physical computing system.

In operation, virtual computing device 520 is configured to execute via hypervisor 515. Hypervisor 515 abstracts physical components of host system 510 and provides them to virtual computing device 520 for execution. Although a single virtual computing device is illustrated in the present example, it should be understood that any number of virtual computing devices might be implemented on the host using hypervisor 515 or an alternative hypervisor on host 510.

Once virtual computing device 520 is initiated, one or more applications may be installed on the virtual machine to allow the machine to accomplish various tasks. Although the applications may be up-to-date when the applications are installed, the applications may need to be updated over time as the developers generate improvements and patches. Accordingly, to update the applications on the device, the applications may need to be terminated before the necessary components can be replaced.

In the present example, rather than updating the local application immediately, host system 510 is communicatively coupled to updated repository 550 with updated application volumes 555 for storing updated applications. As a result, when agent and overlay module 540 identifies that an updated application is needed for virtual computing device 520, one or more volumes within updated application volumes 555 are identified for the updated application. Once the volumes are identified, the volumes are mounted using hypervisor 515 to virtual computing device 520, and the application components are made available or overlaid within the virtual machine by agent and overlay module 540. By making the updated components available, the updated application components may be executed with the locally installed components to provide the updated application to the end user. In some examples, to mount the necessary volumes for the application, hypervisor 515 may be configured to provide virtual computing device 520 with the necessary access path or mapping information to the required application volumes. Once accessible to the virtual machine, the updated application components in the required volumes may be overlaid in virtual computing device 520 to make the updated components accessible with the locally installed application components.

Referring to the elements of system 500, host system 510 may comprise a server computer, a desktop computer, or another similar computing device capable of executing one or more virtual machines using hypervisor 515. Host system 510 may include processing systems, storage systems, user interfaces, communication interfaces, or any other similar computing element.

Updated repository 550 includes one or more updated application volume 555. Updated application volumes 555 may include disk drives, solid state drives, virtual hard disks, and any other similar storage media—including combinations thereof. Updated application volumes 555 may further comprise partitions of physical storage media capable of storing the required applications, and may be located on a serving computing system in some examples.

Communication link 560 uses metal, glass, optical, air, space, or some other material as the transport media. Communication link 560 can use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication link 560 can be a direct link or can include intermediate networks, systems, or devices, and can include a logical network link transported over multiple physical links. Although one main link 560 is shown in FIG. 5, it should be understood that link 560 is merely illustrative to show communication modes or access pathways.

Figure 6:
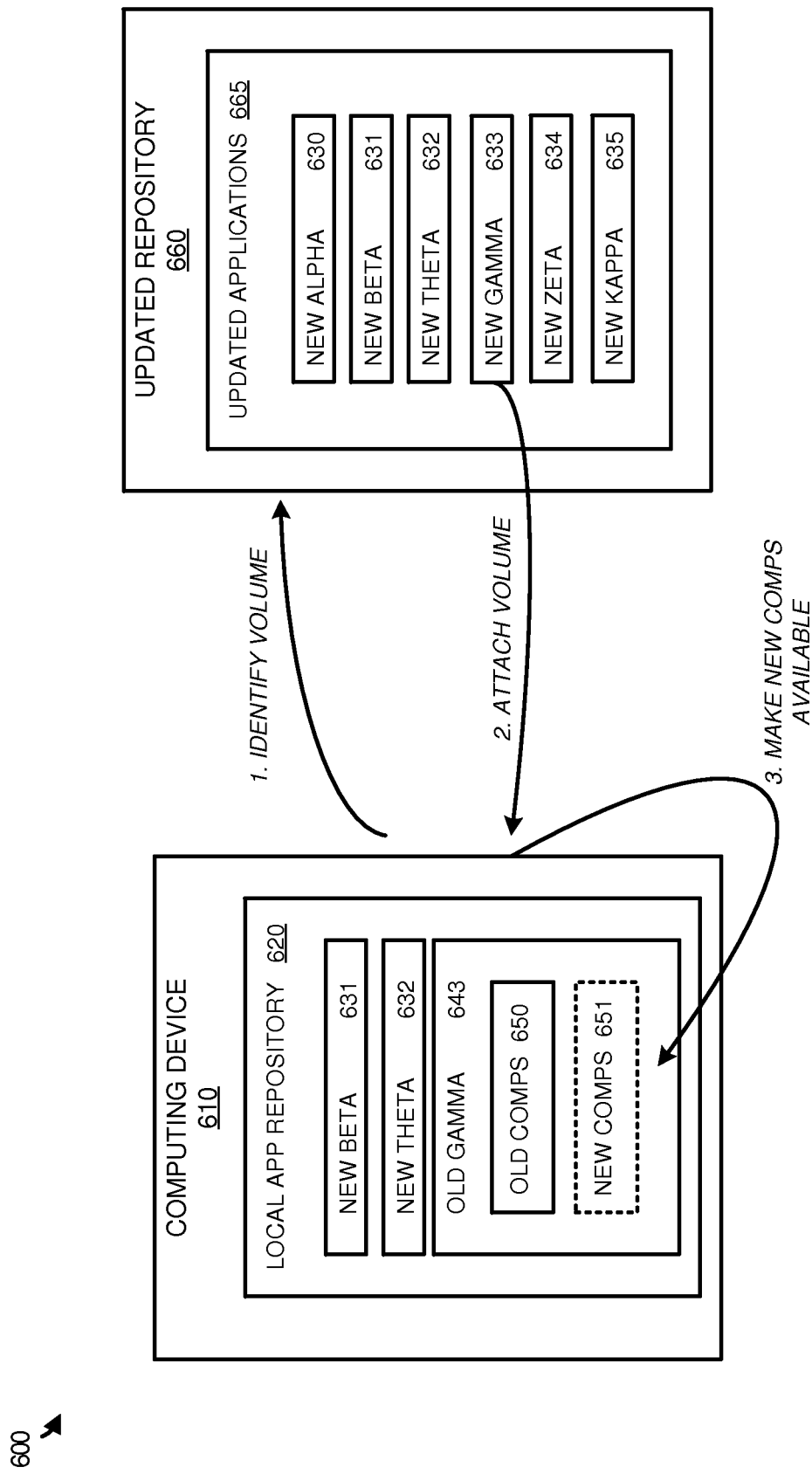
FIG. 6 illustrates an overview of providing updated applications to a computing device in an implementation.

Turning to FIG. 6, FIG. 6 illustrates an overview 600 for providing updated applications to a computing device. Overview 600 includes computing device 610, which may comprise a physical or virtual computing device, and further includes updated repository 660. Computing device 610 further includes local application repository 620, and updated repository 660 further includes updated applications 665. Local application repository 620 further includes new applications 631-632 and old application gamma 643. Updated applications 665 further include new applications 630-635.

In operation, computing device 610 includes one or more installed applications that, when executed, perform various tasks on the computing device. As time progresses, features and other aspects of the application may need to be updated, which takes downtime as the new files, directories, and other components are installed on the device. In the present example, rather than installing the updates to the locally stored application, which may create application downtime while the files are extracted and stored locally on the device, updated applications may be attached to computing device 610.

Specifically, when an update for an application becomes available, one or more volumes are identified for attachment, which include an updated version of that application. Referring to FIG. 6, an update is identified for old application gamma 643. Responsive to this identification, one or more volumes that contain new application gamma 633 are mounted to computing device 610. Once the applications are mounted, the files, directories, and other components necessary for the updated application are made available or overlaid for execution on computing device 610. As depicted, old application gamma 643 includes old components 650, however, when new application gamma 633 is attached, new components 651 are made available to computing device 610. Accordingly, rather than exclusively using old components 650 in the execution of the application, computing device 610 will use new components 651 with the new features and patches.

Although not illustrated in the present example, it should be understood that the local version of old application gamma 643 might be updated to the new application version 633. This local updating may occur when computing device 610 is idle, may occur when the user selects that it is permitted to install the update, or at any other user or processing defined instance. Once the local version of the application is updated, the application volumes are no longer required to be attached, and computing device 610 may execute the local version of the application.

Figure 7:
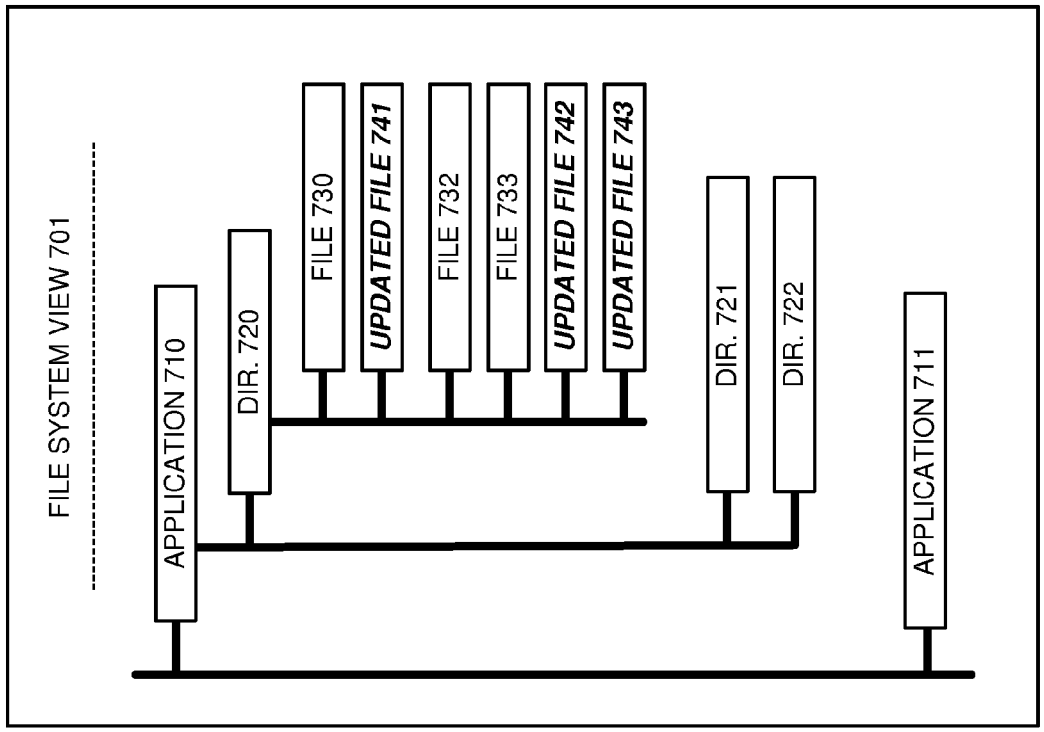
FIG. 7 illustrates a file system view of overlaying updated application components in an implementation.
Figure 7:
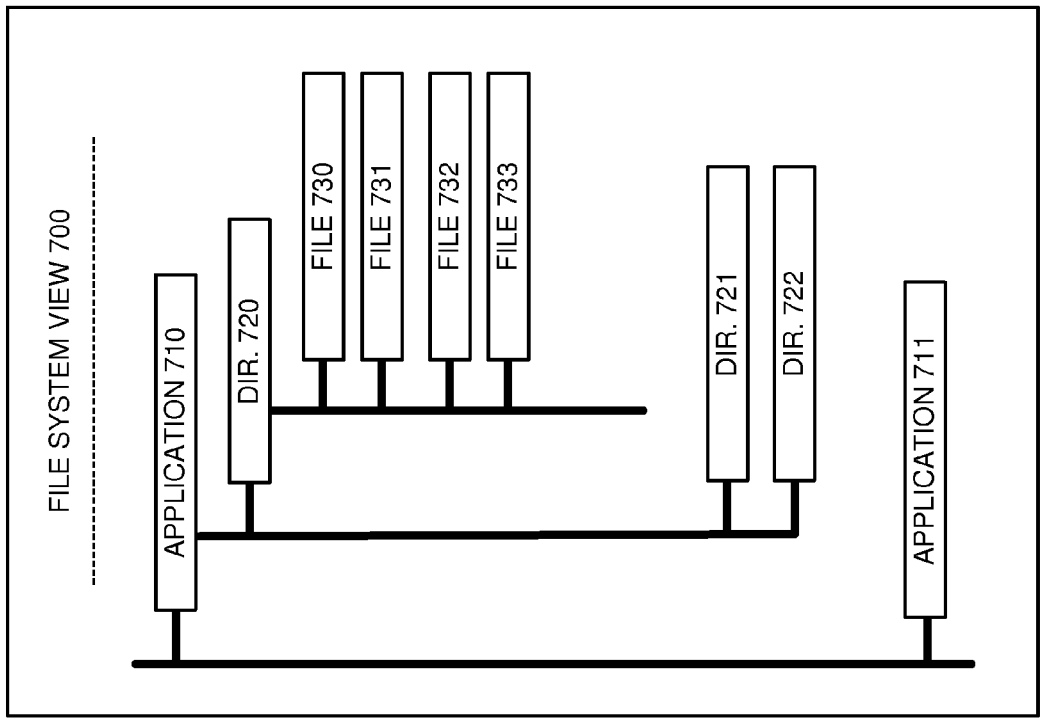

Referring to FIG. 7, FIG. 7 illustrates a file system view of overlaying updated application components. FIG. 7 includes file system views 700-701, which each comprises applications 710-711. In operation, a computing device, either real or virtual, may execute a plurality of applications, such as applications 710-711. These applications each include one or more directories and files that are used in the execution of the application. For example, application 710 initially includes directories 720-722 and files 730-733 in file system view 700.

During the operation of the computing device, an update may be identified for application 710. This update may include new features, security patches, stability improvements, or other updates to the components included in the application. Here, rather than updating the application locally, possibly causing downtime for the end user, one or more application volumes may be identified that include the updated components for the application. Once the volumes are identified, the volumes are mounted to the computing device and the application components are overlaid in an application directory location with the components of the locally installed version of the application.

As illustrated in FIG. 7, updated files 741-743 are overlaid to create file system view 701, allowing the updated files to be executed from the attached volume. Accordingly, updated files 742-743 are added to make file system view 701, and updated file 741 is used to replace file 731. Although files are overlaid in the present example, it should be understood that directories might also be overlaid to provide the updated version of the application. Further, despite not being illustrated in FIG. 7, it should be understood that the local version of application 710 might be updated locally during a downtime event. For example, the user may select to update the local version of the application, the computing device may initiate the local update of the application when the processing system is idle, the local application may be updated when the application is not in use, or at any other downtime event. During or after the update of the local application, the application volume may be un-mounted from the computing device to prevent the computing device from accessing the contents of the volume, and the file system may be updated to direct application calls to the local files of the computing device.

Figure 8:
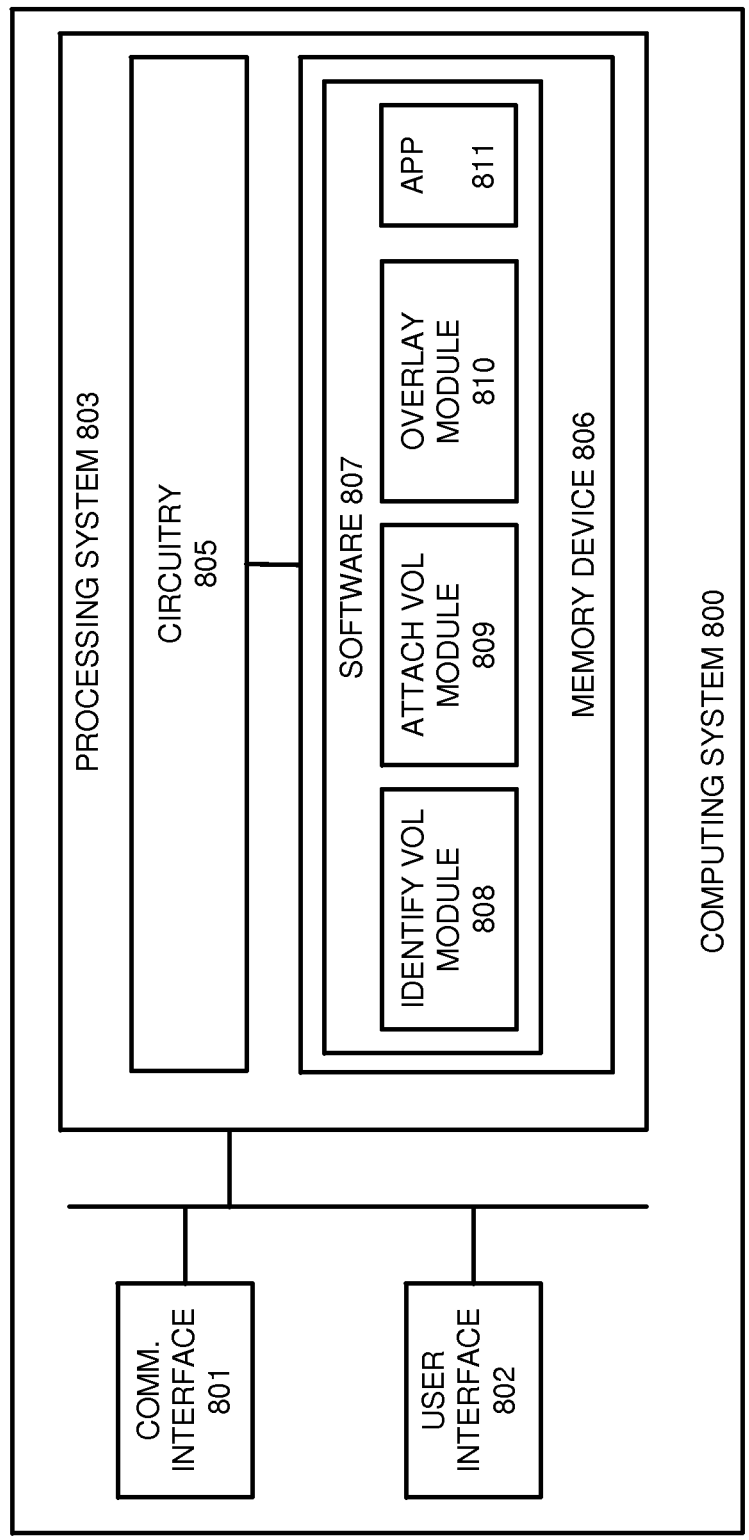
FIG. 8 illustrates a computing system to update applications on a computing device in an implementation.

Turning to FIG. 8, FIG. 8 illustrates a computing system 800 capable of attaching updated applications. Computing system 800 is an example of computing device 110, although other examples may exist. Computing system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, radio frequency (RF) transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof. Communication interface 801 may be configured to communicate with a storage repository containing one or more updated applications. This storage repository may contain one or more application storage volumes capable of providing attachable updated applications to one or more computing devices.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 includes identify volume module 808, attach volume module 809, and overlay module 810. Operating software 807 may further include an operating system, utilities, drivers, network interfaces, applications, such as application 811, or some other type of software. When executed by circuitry 805, operating software 807 directs processing system 803 to operate computing system 800 as described herein.

In particular, application 811 on computing system 800 may require an update that could cause downtime for the application. To minimize the inconvenience of the update, identify volume module 808 identifies the update and one or more storage volumes to be attached that contain an updated version of application 811. Once the volumes are identified, attach volume module 809 mounts the identified volumes to computing system 800, giving computing system 800 access to the contents. Once the volumes are mounted, overlay module 810 makes the application contents, such as files and directories, available on computing system 800. By making the files available, it allows computing system 800 to use the updated version of the application in the attached volume until a convenient time occurs to update local application 811.

Although FIG. 8 illustrates attaching volumes for applications on a physical computing system, it should be understood that the same principles might be applied to a virtual computing device. For example, computing system 800 may include and execute a virtual machine that contains a variety of applications to accomplish tasks on the virtual machine. In much the same way as described previously, an application in the virtual machine may require an update. Accordingly, software modules 808-810, which may reside wholly or partially within the virtual machine, attach and make available updated applications to the virtual machine.

Further, although illustrated in the present example with three software modules, it should be understood that any number of software modules might be employed to attach temporary updated applications.

Returning to the elements of computing environment 100 in FIG. 1, computing device 110 may include any physical or virtual computing system capable of executing one or more applications. Computing device 110 may include physical or virtual processing systems, storage systems, communication interfaces, user interfaces, and any other similar computing elements. In situations where computing device 110 comprises a virtual computing system, computing system 110 may be configured to execute using a hypervisor that resides on a host system. This hypervisor is configured to abstract the physical characteristics of the host system and provide them to the virtual computing system for execution. Further, if computing device 110 comprises a virtual computing device, the hypervisor may be configured to identify and attach the appropriate storage volumes containing the updated application. Accordingly, the virtual computing device may identify the need for an updated application, but the hypervisor or virtual machine manger may identify the storage volume to be mounted to the virtual machine.

Updated repository 160 may include one or more storage volumes to store updated applications 165. Storage volumes may include disk drives, solid state drives, virtual hard disks (VHDs), virtual machine disks (VMDKs), or any other similar storage volume—including combinations thereof. Storage volumes may further comprise partitions of physical storage media capable of storing the required applications.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method for attaching application updates on a computing device, the method comprising:
    identifying an application update for an application stored on the computing device;
    identifying an updated application volume containing an updated version of the application;
    mounting the updated application volume to the computing device;
    overlaying, in a file system view, components of the updated version of the application from the updated application volume with components of the application stored on the computing device; and
    in response to a selection to execute the application, retrieving the components of the updated version of the application from the updated application volume and executing the application on the computing device using the components of the updated version of the application from the updated application volume and at least a portion of the components stored on the computing device.

2. The method of claim 1 wherein the computing device comprises one of a physical computing device or a virtual computing device.

3. The method of claim 1 further comprising, prior to mounting the updated application volume, generating the updated version of the application by executing an application update supplied by a vendor of the application.

4. The method of claim 3 wherein the updated application volume comprises one of a virtual hard disk (VHD) or a virtual machine disk (VMDK).

5. The method of claim 1 further comprising:
    identifying a downtime event for the computing device; and
    in response to the downtime event, updating application components for the application stored on the computing device and un-mounting the updated application volume from the computing device.

6. The method of claim 1 wherein the components of the updated version of the application comprise files for the updated version of the application.

7. The method of claim 6 wherein overlaying, in the file system view, the components of the updated version of the application from the updated application volume with the components of the application stored on the computing device comprises prioritizing conflicting components of the updated version of the application over the components of the application stored on the computing device.

8. An apparatus to provide updated applications to a computing device, the apparatus comprising:
    one or more non-transitory computer readable media; and
    processing instructions stored on the one or more non-transitory computer readable media that, when executed by processing circuitry, direct the processing circuitry to:
    identify an application update for an application stored on the computing device;
    determine an updated volume containing an updated version of the application;
    mount the updated application volume to the computing device;
    overlay, in a file system view, components of the updated version of the application from the updated application volume with components of the application stored on the computing device; and
    in response to a selection to execute the application, retrieve the components of the updated version of the application from the updated application volume and execute the application on the computing device using the components of the updated version of the application from the updated application volume and at least a portion of the components stored on the computing device.

9. The apparatus of claim 8 wherein the computing device comprises one of a physical computing device or a virtual computing device.

10. The apparatus of claim 8 wherein the updated version of the application comprises a version of the application generated by executing an application update, supplied by a vendor of the application, on the application.

11. The apparatus of claim 10 wherein the apparatus further comprises the processing circuitry.

12. The apparatus of claim 8 wherein the processing instructions further direct the processing circuitry to:
    identify a downtime event for the computing device; and
    in response to the downtime event, update application components for the application stored on the computing device and un-mount the updated application volume from the computing device.

13. The apparatus of claim 8 wherein the components of the updated application comprise files for the updated version of the application.

14. The apparatus of claim 13 wherein the processing instructions to overlay, in the file system view, the components of the updated version of the application from the updated application volume with the components of the application stored on the computing device direct the processing circuitry to prioritized conflicting components of the updated version of the application over the components of the application stored on the computing device.

15. The apparatus of claim 14 wherein the updated application volume comprises one of a virtual hard disk (VHD) or a virtual machine disk (VMDK).

16. A system for updating an application on a computing device, the system comprising:
one or more application volumes that store one or more applications; and
a processing system configured to:
identify an application update for the application stored on the computing device;
determine an updated application volume in the one or more application volumes containing an updated version of the application;
mount the updated application volume to the computing device;
overlay, in a file system view, components of the updated version of the application from the updated application volume with components of the application stored on the computing device; and
in response to a selection to execute the application, retrieve the components of the updated version of the application from the updated application volume and execute the application on the computing device using the components of the updated version of the application from the updated application volume and at least a portion of the components stored on the computing device.

17. The system of claim 16 wherein the computing device comprises one of a physical computing device or a virtual computing device.

18. The system of claim 16 wherein the computing device comprises a virtual computing device that executes using a hypervisor, and wherein the updated application volume comprises one of a virtual hard disk (VHD) or a virtual machine disk (VMDK).

19. The system of claim 16 wherein the processing system is further configured to:
identify a downtime event for the computing device; and
in response to the downtime event, update application components for the application stored on the computing device and un-mount the updated application volume from the computing device.

* * * * *